United States Patent
Resetich

[11] 3,797,216
[45] Mar. 19, 1974

[54] CROP PICK-UP MECHANISM
[75] Inventor: John Martin Resetich, Silvis, Ill.
[73] Assignee: Deere & Company, Moline, Ill.
[22] Filed: Mar. 2, 1972
[21] Appl. No.: 231,107

[52] U.S. Cl. ................................................ 56/364
[51] Int. Cl. ............................................ A01d 89/00
[58] Field of Search ............ 56/364, 344, 11.9, 13.5

[56] References Cited
UNITED STATES PATENTS

| | | | |
|---|---|---|---|
| 2,390,419 | 12/1945 | Brown et al. | 56/364 |
| 3,308,612 | 3/1967 | Oblinger | 56/364 X |
| 2,763,119 | 9/1956 | Helfeld | 56/344 |
| R26,512 | 12/1968 | Rohweder | 56/11.9 |

Primary Examiner—Robert Peshock
Assistant Examiner—J. N. Eskovitz

[57] ABSTRACT

A pick-up includes a first finger drum which rotates in a forward direction and at a fingertip speed slightly less than ground speed so that the fingers scoop into the crop and lift the crop at the rear. A second finger drum rotates in a reverse direction and at a higher speed than the first drum to pick up crop material from the first drum and deliver the same rearwardly to a platform.

8 Claims, 2 Drawing Figures

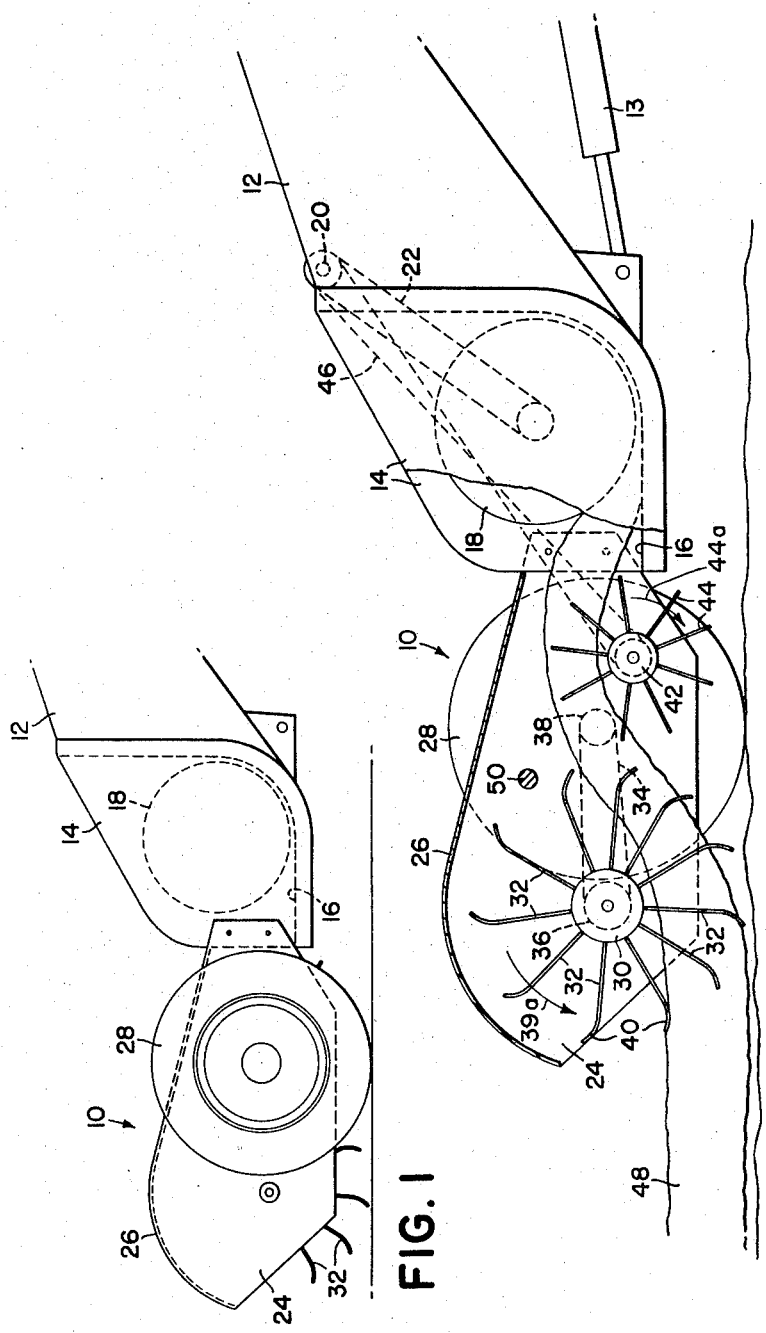

3,797,216

CROP PICK-UP MECHANISM

BACKGROUND OF THE INVENTION

The present invention relates generally to crop harvesters, and more particularly relates to a pick-up mechanism for picking up windrowed crop material and delivering the same to a harvester platform.

When picking up windrowed crop with a conventional pick-up mechanism, there is a definite problem of picking up stones or other objects which may cause damage to the harvesting implement. Due to the speed or velocity of the pick-up fingers on the conventional pick-up mechanism, stones are very often kicked forward of the implement. Many times the stones which are kicked forwardly roll on top of or into the windrow and are then carried into the harvesting implement. In addition, when picking up a light windrowed crop which is laying down in stubble, it is sometimes necessary to run the pick-up fingers very close to the ground in order to pick up all the crop. When the pick-up fingers contact the ground in downed crop conditions, the speed of the fingers sweep dirt back on top of the pick-up and it is then carried into the harvesting implement.

SUMMARY OF THE INVENTION

The principal object of the present invention is to provide a pick-up mechanism for crop harvesting implements which will not pick up stones and which, when operating in downed crop conditions, leaves the ground almost totally undisturbed.

A more specific object of the invention is to provide a pick-up mechanism which has a first finger drum which revolves in a direction which is opposite to the direction of movement of the conventional pick-up mechanisms and which revolves at a tip speed less than the forward speed of the implement, and which includes a second finger drum which rotates in a direction opposite to the direction of rotation of the first drum for receiving crop material from the first drum and delivering the same rearwardly to a harvesting platform.

The above objects and additional objects and advantages of the present invention will become apparent, along with the details of construction of a preferred embodiment of the invention, to those skilled in the art from a reading of the following detailed description when taken in conjunction with the accompanying drawing.

BRIEF DESCRIPTION OF THE DRAWING

In the drawing:

FIG. 1 is a side elevational view of a crop pick-up mechanism attached to a combine platform; and, FIG. 2 is an enlarged view similar to FIG. 1 but having parts broken away to illustrate the finger drums.

DESCRIPTION OF THE PREFERRED EMBODIMENT

Referring to the drawing, the pick-up mechanism according to the present invention is indicated generally at 10 and is illustrated as being secured to a platform on the forward end of a combine feeder house 12. Although not illustrated, the feeder house is a conventional structure and can be raised and lowered about a rear transverse pivot by hydraulic cylinder 13. The platform is also of conventional construction and includes side walls 14, a bottom wall 16 and a transverse auger 18. The connection between the feeder house 12 and the platform is preferably of the type illustrated, described and claimed in U.S. reissue Pat. No. Re. 26,512 which issued to G. W. Rohwedder on Dec. 31, 1968. A prime mover (undisclosed) on the combine transmits power to a shaft 20 at the forward end of the feeder house, and this shaft is interconnected with the auger 18 by an endless belt or chain 22 which is trained about sheaves or sprocket wheels on the auger 18 and shaft 20.

The pick-up mechanism includes a frame consisting of a pair of side walls 24 and a top wall 26. The rear ends of the side walls 24 are rigidly secured to the side walls 14 of the platform and extend forwardly therefrom. A pair of wheels 28 are journaled to the side walls 24 and support the pick-up mechanism and platform a fixed distance above the ground whenever the cylinder 13 is retracted to lower the forward end of the feeder house. A forward relatively large finger drum is journaled between the forward ends of the side walls and includes small hub section 30 and a plurality of radially extending fingers 32. The fingers 32 are of a length to be in close proximity to the ground surface or to just contact the ground surface when extending downwardly and the pick-up is supported on the wheels 28. The forward drum is interconnected with one of the wheels 28 by a belt or chain 34 which is trained about a sheave or sprocket wheel 36 on one end of the forward drum and a sheave or sprocket wheel 38 on the wheel 28. The belt 34 provides a direct connection between the wheel and forward drum so that the forward drum is driven in the direction indicated by the arrow 39a. The sheaves or sprocket wheels 36 and 38 are sized such that the forward drum is driven at a fingertip speed which is slightly less than the forward ground speed of the implement. The extreme outer portions 40 of the fingers 32 extend slightly to the rear with respect to the direction of rotation for a purpose which will be explained hereinafter.

A rear relatively small finger drum is journaled between the side walls 24 directly behind the forward drum and directly in front of the platform. The rear drum includes a small hub portion 42 and a plurality of radially extending fingers 44. An endless belt or chain 46 trained about sheaves or sprocket wheels on the rear drum and the shaft 20 drives the rear finger drum at a speed proportional to the speed of the auger 18 and in the direction indicated by the arrow 44a which is opposite to the direction of rotation of the forward finger drum.

For operation, the hydraulic cylinder 13 is retracted to lower the platform and pick-up mechanism on the wheels 28. A clutch (undisclosed) on the combine is engaged to provide power to the shaft 20 to rotate the auger 18 and rear finger drum. Upon forward motion, the forward finger drum is rotated but at a fingertip speed slower than the forward speed of the implement. This causes the outer portions 40 of the fingers 32 to scoop under windrowed crop material 48 to lift the same to the rear as is illustrated in FIG. 2. The rear finger drum which rotates at a higher speed and in an opposite direction than the forward finger drum receives the crop material from the forward drum and delivers the same to the platform where it is delivered to the feeder house 12 by the auger 18. Due to the relative speeds of the front and rear finger drums, the rear finger drum has a tendency to strip material from the forward finger drum so that it is not carried around a full revolution of the front finger drum. However, if all the material is not stripped from the fingers of the front finger drum, a stripper bar 50 which extends between the side walls 24 for engagement with the outer tips of the fingers 32 will knock any crop material off the fingers 32.

Because of the direction of rotation of the front finger drum, stones or other solid objects are not kicked ahead of the drum and onto the windrow. Also, because of the relatively slow rotational speed of the fingers 32, they will not kick any loose dirt up into the platform.

From the foregoing description of the preferred embodiment of the invention, it can be seen that the present invention provides a novel crop pick-up mechanism which, while effectively picking up a windrowed crop will not kick stones or dirt onto the windrow for subsequent delivery to the harvesting implement.

Although only a single preferred embodiment of the invention has been described and illustrated, various modifications within the spirit and scope of the invention will become apparent to those skilled in the art and can be made without departing from the underlying principles of the invention.

I claim:

1. In a harvester having a crop-receiving unit, a crop pick-up for removing crop from the ground and delivering it rearwardly to the crop-receiving unit comprising: a frame including a pair of side members secured to the crop-receiving unit and extending forwardly therefrom; a pair of ground wheels journaled to the side members for rotation upon forward movement of the harvester at a circumferential rate corresponding to the rate of forward movement, a first drum journaled between the side member and having a plurality of radially extending fingers secured thereto; the fingers being of a length to have their outer ends in close proximity to the ground surface when extending downwardly; drive means interconnecting the first drum with at least one of the wheels to drive the fingers thereon at a tip rate slightly less than the rate of forward movement of the harvester and in the same direction as the wheels; a second drum journaled between the side walls rearwardly of the first drum and having a plurality of radially extending fingers whose outer ends are spaced from the ground when extending downwardly; and drive means connected to the second drum for driving the fingers thereon at a tip rate greater than the tip rate at which the fingers on the first drum are driven and in the opposite direction.

2. The combination as set forth in claim 1 wherein the outer ends of the fingers on the first drum are bent slightly to the rear with respect to the direction of rotation of the first drum.

3. The combination as set forth in claim 2 wherein the drive means connected to the second drum interconnects the second drum with a rotating member on the harvester to drive the second drum at a rate proportional to the rate of the rotating member.

4. In a crop harvester adapted to advance forwardly and having a transverse forwardly disposed harvesting platform including a generally horizontal bottom with a transverse leading edge, an auger supported above the platform bottom rearwardly of the leading edge and operative to transversely converge crop material and deliver it rearwardly, drive means on the harvester interconnected with and for driving the auger, the improvement residing in a crop pick-up for removing crop from the ground and delivering it rearwardly for placement on the platform bottom comprising: a frame including a pair of side members secured to the platform and extending forwardly therefrom; a rear finger drum journaled between the side members directly in front of the leading edge of the platform bottom; means interconnecting the rear finger drum with the drive means for driving the rear finger drum at a speed proportional to the speed of the drive means, a front finger drum journaled between the side members; a pair of wheels journaled to the side members and supporting the pick-up in a vertical position with the front finger drum in close proximity to the ground; and endless flexible drive means interconnecting the front finger drum with one of the wheels to drive the front finger drum in the same direction as and at a speed proportional to the speed of the wheels and at a peripheral speed less than the forward speed of the combine.

5. The combination as set forth in claim 4 wherein the front finger drum includes a plurality of generally radially extending fingers whose outer ends extend slightly to the rear with respect to the direction of rotation of the front finger drum.

6. In a combine adapted to advance forwardly and including a forwardly extending feeder house having its rear end supported on a transverse pivot, power means for raising and lowering the forward end of the feeder house about the transverse pivot, a transverse platform secured to the forward end of the feeder house and having a bottom wall with a transverse leading edge, an auger supported above the platform bottom wall rearwardly of the leading edge and operative to transversely converge crop material and deliver it rearwardly to the feeder house, and drive means on the combine connected with and for driving the auger, a crop pick-up comprising: a pair of side walls rigidly secured to and extending forwardly of the platform; a pair of wheels journaled on the side walls for supporting the platform and pick-up when the forward end of the feeder house is lowered; a first forward drum journaled between the side walls and including a plurality of generally radially extending fingers of a length to have their outer ends in close proximity to the ground surface when extending downwardly and the pick-up is supported by the wheels; power transfer means interconnecting the first drum with one of the wheels for imparting rotary motion to the first drum in the same direction as the rotary motion of the wheels and at a fingertip speed less than the forward speed of the combine; a second rear drum journaled between the side walls intermediate the first drum and the leading edge of the bottom of the platform; the second drum including a plurality of generally radially extending fingers having outer ends spaced from the ground surface; and means interconnecting the second drum with the drive means to selectively impart a rotary motion to the second drum in a direction opposite to the rotary motion of the first drum and at a fingertip speed greater than the fingertip speed of the first drum.

7. A combination as set forth in claim 6 wherein the outer ends of the fingers on the first drum extend slightly to the rear with respect to the direction of rotation of the first drum.

8. A combination as set forth in claim 6 wherein a top wall extends between and interconnects the side walls and has a fore-and-aft dimension sufficient to overlie both the first and second drums.

* * * * *